Feb. 1, 1955     L. P. EVANS     2,701,185
APPARATUS FOR REGENERATION OF SOLID CONTACT MATERIAL
Filed Dec. 19, 1952
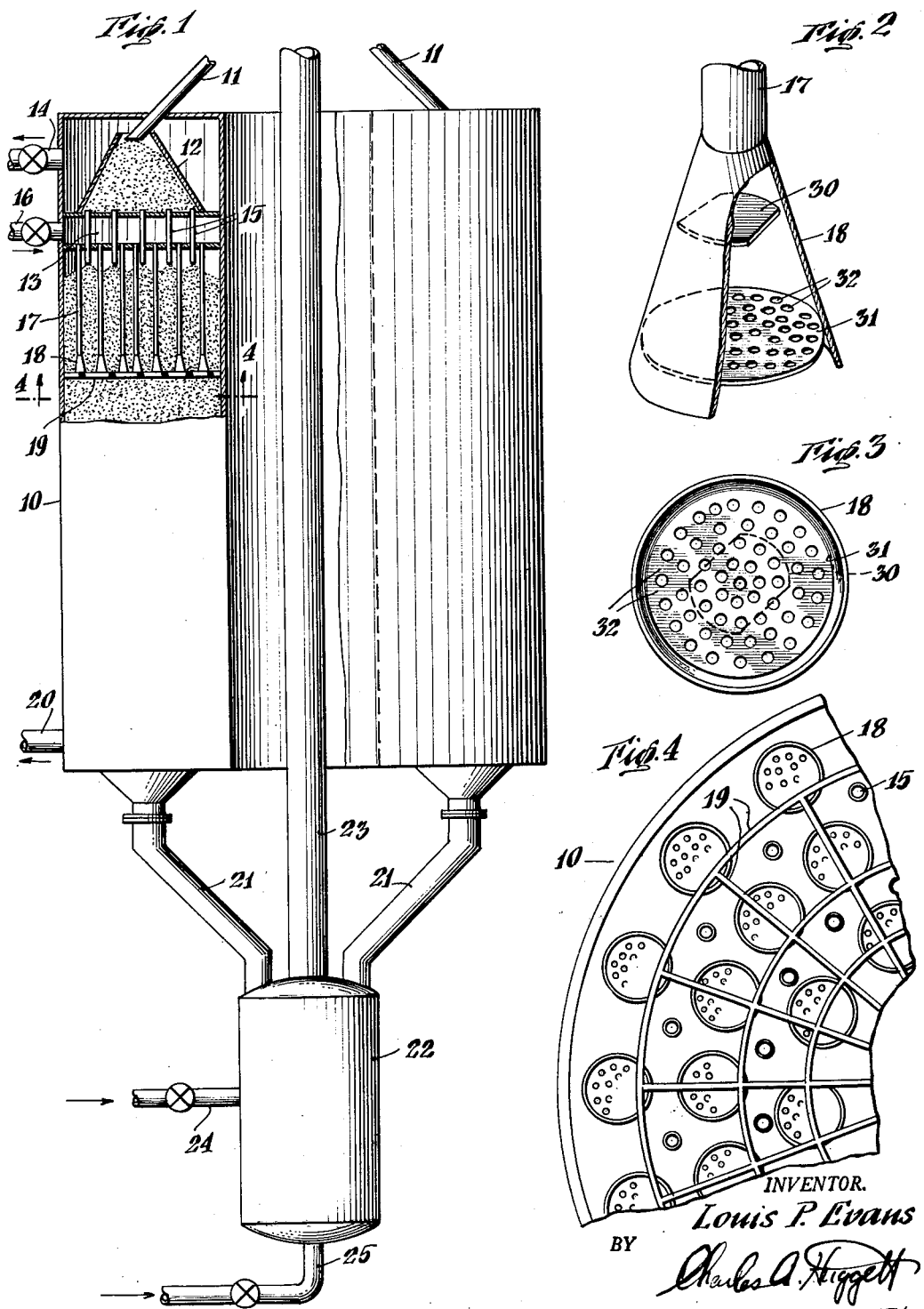
INVENTOR.
Louis P. Evans
BY
Charles A. Higgett
ATTORNEY United States Patent Office 2,701,185
Patented Feb. 1, 1955

2,701,185

APPARATUS FOR REGENERATION OF SOLID CONTACT MATERIAL

Louis P. Evans, Woodbury, N. J., assignor to Socony-Vacuum Oil Company, Incorporated, a corporation of New York Application December 19, 1952, Serial No. 326,944

3 Claims. (Cl. 23—284)

This invention relates to the regeneration of spent granular contact material in a moving bed hydrocarbon conversion process. It is particularly directed to an improved apparatus for contacting granular material containing carbonaceous deposits with air to effect removal of the deposits by burning.

Various hydrocarbon conversion processes, such as desulfurization, hydrogenation, reforming and cracking use granular solid particles as a catalyst or heat-carrying material to effect desired conversion reactions. The granular material may be gravitated as a compact column through reaction and regeneration zones and transferred from the bottom of one zone to the top of the other zone to complete an enclosed cyclic path. Hydrocarbons are passed through the voids in the bed of solids in the reaction zone and converted products are removed therefrom. The reaction zone is maintained at suitable reaction temperature and pressure. For example, for cracking the temperature may be about 800–1100° F. and the pressure about 5–30 p. s. i. (gauge). As the particles gravitate through the zone a carbonaceous material accumulates on the contacting surface. Therefore, air is blown through the bed of solids in the regeneration or reconditioning zone to burn the deposit and prepare the solids for reuse in the reaction zone. The pressure is maintained, usually, at about 0 p. s. i. in the regeneration zone and the temperature is usually maintained at about 1000–1300° F. It is desirable to burn the deposits from the contact material as rapidly as possible and yet if this is done at too rapid a rate, particularly when using catalytic materials, the catalyst may be damaged by the high temperature. When inerts are used solely as a heat carrying material in processes such as visbreaking or coking, the temperature in the burner or kiln may be substantially above the limit for catalyst.

The contact material may be catalytic or non-catalytic. Suitable catalysts are well known in the art, such as various natural or treated clays or synthetic siliceous materials. A variety of inerts are also known such as fused silica, coke, carborundum, Corhart or Mullite. The size of the particles may range from about 0.5 to about 0.005 inch, depending upon the process. For example, in catalytic cracking it is desirable to use particles of uniform size and shape. This provides uniform gas distribution across the catalyst bed. It is preferred to use particles which are large enough to avoid excessive pressure drop across the bed. A suitable size range for cracking is about 4–12 mesh Tyler screen analysis.

Recently a kiln was provided for the regeneration of spent contact catalyst in which the catalyst was gravitated as a compact column from a point near the top of the vessel. Air was introduced into a housing above the bed of catalyst in the upper portion of the kiln and passed downwardly into the bed through depending drop pipes. The gas released from the pipes into the bed travelled in two streams upwardly and downwardly through the bed. One of the streams was withdrawn from the top of the vessel and the other was withdrawn from the bottom of the vessel. Distributors of gradually increasing cross-section were located at the bottom of the depending drop pipes to bring the gas into contact with the catalyst more uniformly. A strap of steel was placed laterally across the distributors in a horizontal plane in such a way that the downwardly moving gas struck the plate and was dispersed to some extent. It has been found that the gas flow through the distributors causes the catalyst to strike the horizontal straps under the distributors with the result that some of the catalyst is broken and the strap is eroded to some extent. Also, horizontal spacer bars located across the vessel beneath the distributors, designed to positively locate the lower end of the depending pipes, and strengthen the structure, are eroded to a large extent by the slipping about of the catalyst under the distributor.

It is an object of this invention to provide a means for introducing a combustion-supporting gas into a spent solid bed through apparatus of the type described above with minimum catalyst attrition or erosion of the metal.

In this invention the air is introduced into a gravitating bed of catalyst in the kiln through a tube extending down into the bed and terminating in an outwardly-tapered, open-bottomed distributor. A plate baffle is located in the distributor below the air tube to break up and disperse the air so it will not impinge at high velocity on the catalyst surface below the distributor and a perforated plate is located across a lower portion of the distributor to uniformly distribute the gas flow entering the bed of solid material, whereby turbulence of the catalyst on the bed surface under the distributor is avoided.

The invention will now be described in more detail with reference to the attached figures.

Figure 1 is a vertical view, partially in section, of a typical kiln incorporating the features of this invention.

Figure 2 is an isometric sketch of the bottom of the air tube, showing the gas distributor with the plate baffle and perforated plate in position.

Figure 3 is a plan view of the perforated plate.

Figure 4 is a plan view of Figure 1 as seen on plane 4—4 of Figure 1.

Referring to the Figures 1–4, the kiln 10 shown is of annular cross-section for use in a moving bed conversion system which incorporates a gas lift projected upwardly through the open central region of the kiln for upward transfer of the catalyst. Particles are gravitated through the pipes 11 into the region enclosed by the frusto-conical baffles 12, located in the upper portion of the vessel 10. The baffles 12 are located over header boxes 13 and confine the catalyst to a cross-sectional area less than that of the vessel 10, so as to permit gas to flow upwardly around the header boxes 13 to the gas discharge pipe 14. Transfer pipes 15 are projected downwardly through the header box 13 to transfer catalyst below the box. The catalyst discharged from the transfer pipes 15 expands to provide a gravitating column of catalyst covering the entire cross-section of the vessel. Air is introduced into the header box 13 through the pipe 16 and travels downwardly through the depending pipes 17, which are uniformly distributed across the header box and terminate in the kiln at a uniform level below the top of the bed of catalyst. Distributors 18, in the form of truncated cones, are located at the bottom of the air pipes 17. The distributors are attached to the horizontal spacer bars 19. The gas introduced into the bed by the air pipes 17 splits into two streams, one travelling upwardly through the bed and the other travelling downwardly. The upper stream disengages from the catalyst about the transfer pipes 15 and travels upwardly about the header box 13 to the withdrawal pipe 14 in the upper portion of the vessel. The lower stream passes downwardly through the bed to withdrawal channels, not shown, and is removed from the vessel through the pipe 20. The depending pipe air introduction scheme provides gas introduction into the bed at an intermediate level with a minimum amount of the bed cross-section at the level of gas introduction being used for gas introduction apparatus. The regenerated catalyst is withdrawn from the bottom of the vessel through the conduits 21 and introduced into the lift feed tank 22. A lift gas is introduced into the tank 22 through the pipes 23, 24 and the particles are conveyed upwardly through the lift pipe as part of a continuous enclosed cyclic path.

Figure 2 shows an isometric view of the lower end of the air pipe. The distributor 18 shown is in the form of a truncated cone, however, other shapes may be used. For example, the distributor may be in the form of a truncated pyramid having triangular other polygonal cross-section. In less preferred form, the horizontal baffle 30 located diametrically across the upper portion of the distributor may be eliminated. The openings 32 in the plate 31 may be circular, square, triangular or of other geometric form and may be provided by drilling, milling or punching or other process providing uniform openings. Alternatively, a woven screen of the proper dimensions may be used to accomplish the desired result. The area of the openings 32 in the plate 31 should be equivalent to from 2 to 8 times the area of the air inlet pipe, and preferably 3 to 5 times the area of the pipe. The number of openings in the plate should be from 1 to 12 per square inch of open plate area and preferably 3 to 5 per square inch. The plate should be located at a distance above the lower end of the expanded section equivalent to from 1 to 3 times the diameter of the circular openings and preferably twice the diameter. In the case of non-circular openings, the diameter of a circle of equivalent area may be used in determining the distance in this fashion. The openings should be uniform in size and form and should be distributed throughout the area of the plate in a uniform manner.

The expanded section usually takes the form of a frustum, with side walls located at an angle which will not prevent the flow of particle past in the section. The angle of the walls with the horizontal should be at least 60 degrees, and may be as much as about 70–80 degrees. The height of the frustum is limited by the decrease in cross-sectional area of the compact bed which results from the expansion of the tube. The free cross-section at the level of the bottom of the expanded sections must be sufficient to allow passage of the gases going to the upper section of the kiln without stopping the flow of granular material. The free area should be no more than twice the area required for passage of the gases, and preferably from one and one-quarter to one and one-third times the minimum area.

Commercial kilns using gas pipes projected down into the catalyst bed for feeding air to the bed at an intermediate level and incorporating an expanded distributor at the bottom of the pipes of frusto-conical shape with a horizontal plate baffle across the upper portion of the distributor but not using a perforated plate in the lower section of the distributor, have been found to produce high attrition. Excessive erosion of the spacer bars which are located between adjacent distributors and of the under side of the plate baffle and the interior of the distributors has been observed in these kilns after only a few months operation.

A model was made of a gas pipe and distributor out of transparent plastic of the same size as that used in a commercial kiln for a standard 15,000 bbls. per day T. C. C. system. This model was operated at the same air flow rate used in the commercial kiln in a bed of granular catalyst and the operation was observed. It was seen that the catalyst was violently agitated under the distributors by the air entering the catalyst bed. The commercial gas introduction apparatus comprises a 75° cone attached to the end of a 2-inch pipe with a deflector baffle plate located about one-third of the way down the cone in a horizontal position diametrically across the interior of the cone. The air stream in passing around the plate baffle is thrown into a flow pattern which causes catalyst to boil up into the dead space under the plate. Some of the particles then fall or are thrown into the air stream passing the plate, which accelerates their fall back into the catalyst bed. It was found that locating a perforated plate of the type described hereinabove near the bottom of the distributor eliminated the turbulence of the catalyst under the distributor. The model of the air inlet without the perforated plate was operated for a 24-hour period at air rates similar to those used in the commercial kilns and the amount of fines produced in a static bed about the air inlet by the violent agitation of the catalyst was measured. It was found that the attrition caused by this phenomenon would amount to about 0.02 ton per day in a 15,000 bbls./day T. C. C. unit. This attrition is eliminated by locating a perforated plate of the size and shape described hereinabove in the lower portion of each distributor.

I claim:

1. A kiln for regenerating a spent contact material comprising: an upright vessel, a contact material inlet in the upper portion thereof, a contact material outlet in the lower portion thereof, a gas introduction manifold in the upper portion of the vessel, conduit means for introducing gas into said manifold projected through the wall of said vessel, at least one depending gas pipe attached to the bottom of said manifold, an outwardly-tapered gas distributor attached to the bottom of said gas pipe, a plate baffle horizontally located across the interior of said distributor below the gas tube, so as to break up and disperse the gas flowing downwardly through the distributor, a perforated plate across the lower portion of the distributor, to uniformly distribute the gas flow entering a bed of contact material maintained about the distributor whereby the turbulence of the contact material in the bed surface under the distributor is avoided and conduit means attached to said vessel for withdrawing gas from the vessel after passage through a substantial thickness of the contact material bed maintained in said vessel.

2. A kiln for regenerating a spent contact material comprising: an upright vessel, a contact material outlet in the lower portion thereof, a gas introduction manifold in the upper portion of the vessel, conduit means for introducing gas into said manifold projected through the wall of said vessel, at least one depending gas pipe attached to the bottom of said manifold, an outwardly tapered gas distributor attached to the bottom of said gas pipe, a plate baffle horizontally located diametrically across the interior of said distributor, in the upper portion thereof, so as to break up and disperse the gas flowing through the distributor, a perforated plate across the lower portion of the distributor, the openings in said plate being substantially equal and uniformly distributed over the plate, the total area of the openings being about 2–8 times the cross-sectional area of the gas pipe, the density of the openings being about 1–12 openings per square inch of cross-section, the plate being located at about 1–3 times the diameter of the openings above the bottom of the distributor and conduit means for withdrawing gas from the vessel located in the upper and lower ends of said vessel.

3. A kiln for regenerating a spent contact material comprising: an upright vessel, a contact material inlet in the upper portion thereof, a contact material outlet in the lower portion thereof, a gas introduction manifold in the upper portion of the vessel, conduit means for introducing gas into said manifold projected through the wall of the vessel, at least one depending gas pipe attached to the bottom of said manifold, a frusto-conical distributor attached to the bottom of said gas pipe, the wall of said distributor being located at about 75 degrees with the horizontal, a plate baffle horizontally located diametrically across the interior of said distributor, about ⅓ of the way down from the top of said distributor, a perforated plate across the lower portion of the distributor, the openings in said plate being substantially equal and uniformly distributed over the plate, the total area of the openings being about 3–5 times the cross-section of the pipe, the density of the openings being about 3–5 openings per square inch of cross-section, the plate being located at about twice the diameter of the openings above the bottom of the distributor and gas outlets in the top and bottom of the vessel.

References Cited in the file of this patent

UNITED STATES PATENTS 2,458,412    Payne _____ Jan. 4, 1949